United States Patent
Fischer-Toubol et al.

(10) Patent No.: US 10,671,525 B2
(45) Date of Patent: Jun. 2, 2020

(54) SPACE RECLAMATION IN DATA DEDUPLICATION STORAGE SYSTEMS

(71) Applicant: International Business Machines Corporation, Armonk, NY (US)

(72) Inventors: Jonathan Fischer-Toubol, Tel Aviv (IL); Asaf Porat-Stoler, Tel Aviv (IL); Yosef Shatsky, Karnei Shomron (IL)

(73) Assignee: International Business Machines Corporation, Armonk, NY (US)

(*) Notice: Subject to any disclaimer, the term of this patent is extended or adjusted under 35 U.S.C. 154(b) by 213 days.

(21) Appl. No.: 15/629,662

(22) Filed: Jun. 21, 2017

(65) Prior Publication Data

US 2018/0373628 A1    Dec. 27, 2018

(51) Int. Cl.
*G06F 12/02* (2006.01)
*G06F 3/06* (2006.01)

(52) U.S. Cl.
CPC .......... *G06F 12/0253* (2013.01); *G06F 3/067* (2013.01); *G06F 3/0608* (2013.01); *G06F 3/0652* (2013.01); *G06F 12/023* (2013.01); *G06F 12/0238* (2013.01); *G06F 3/0641* (2013.01); *G06F 12/02* (2013.01);
(Continued)

(58) Field of Classification Search
CPC ...... G06F 3/0641; G06F 12/02; G06F 12/023; G06F 12/0238; G06F 12/0253; G06F 3/0608; G06F 3/0652; G06F 3/067; G06F 2212/7205; G06F 2212/7207
USPC ......................................................... 711/100
See application file for complete search history.

(56) References Cited

U.S. PATENT DOCUMENTS 5,325,523 A * 6/1994 Beglin .................. G06F 3/0601
7,409,523 B2 * 8/2008 Pudipeddi ............. G06F 3/0607
                                                          711/153
(Continued)

FOREIGN PATENT DOCUMENTS

CN          102024021 A  *  4/2011   ............. G06F 17/30

OTHER PUBLICATIONS

Machine Translation of CN102024021A provided by Google Patents (Year: 2011).*

(Continued)

*Primary Examiner* — Reginald G Bragdon
*Assistant Examiner* — Aaron D Ho
(74) *Attorney, Agent, or Firm* — Zilka-Kotab, P.C.

(57) ABSTRACT

A computer program product, according to one embodiment, includes a computer readable storage medium having program instructions embodied therewith. The computer readable storage medium is not a transitory signal per se. The program instructions are readable and/or executable by a processor to cause the processor to perform a method which includes: receiving a request to delete a volume stored in one or more regions in physical space of a storage system; determining whether at least one of the regions having at least a portion of the volume includes reclaimable space; deleting the portion of the volume from the at least one region having the reclaimable space in response to determining that at least one of the regions having at least a portion of the volume includes reclaimable space; and failing the received request to delete the volume in response to determining that none of the regions include reclaimable space.

20 Claims, 7 Drawing Sheets

(52) U.S. Cl.
CPC ........... *G06F 2212/7205* (2013.01); *G06F 2212/7207* (2013.01)

(56) References Cited

U.S. PATENT DOCUMENTS

| | | | |
|---|---|---|---|
| 7,702,873 B2* | 4/2010 | Griess | G06F 3/0608 |
| | | | 711/100 |
| 8,195,636 B2 | 6/2012 | Stager et al. | |
| 8,224,874 B2 | 7/2012 | Guo et al. | |
| 8,224,875 B1 | 7/2012 | Christiaens et al. | |
| 8,549,223 B1* | 10/2013 | Kaliannan | G06F 3/0608 |
| | | | 711/114 |
| 8,635,422 B1* | 1/2014 | Kaliannan | G06F 3/0608 |
| | | | 711/170 |
| 8,650,228 B2 | 2/2014 | Wideman et al. | |
| 8,954,398 B1 | 2/2015 | Zhang et al. | |
| 9,460,008 B1* | 10/2016 | Leshinsky | G06F 12/0253 |
| 9,710,165 B1* | 7/2017 | Lherault | G06F 3/0608 |
| 2009/0265399 A1* | 10/2009 | Cannon | G06F 16/1748 |
| 2010/0042802 A1* | 2/2010 | Helman | G06F 3/0605 |
| | | | 711/173 |

OTHER PUBLICATIONS

Nagesh, P. C., et al., "Rangoh: Space Management in Deduplication Environments," Proceedings of the 6th International Systems and Storage Conference, ACM, 2013, pp. 6.
Amit et al., U.S. Appl. No. 15/084,410, filed Mar. 29, 2016.
Shatsky et al., U.S. Appl. No. 15/262,066, filed Sep. 12, 2016.

\* cited by examiner

SPACE RECLAMATION IN DATA DEDUPLICATION STORAGE SYSTEMS

BACKGROUND

The present invention relates to data storage, and more specifically, this invention relates to space reclamation in a data deduplication storage system.

Storage systems which store large amounts of data sparsely written within a virtual namespace can partition the namespace into regions, each region being managed as a non-overlapping portion of the namespace. As an example, a block storage system may provision many volumes, each volume having an address space of many gigabytes (GBs). Similarly, each volume may include a plurality of regions, and a region may span 1-100 megabytes (MBs) within the volume. Thus, each volume is partitioned into multiple regions, each managing data stored in their own namespace.

Furthermore, in a primary storage system which is dominated by complex read and write data accesses of relatively small size (e.g. 4 kB or 64 kB), performance is often a key requirement and therefore persistent metadata utilized to service data requests must be primarily referenced while in fast-access memory. In conventional storage systems, it is not always possible to keep all metadata needed to efficiently manage the entire namespace in fast-access memory, as the amount of metadata necessary for such management may exceed the available memory.

The amount of metadata necessary for efficient management of a namespace may also increase in systems employing data deduplication to maximize the amount of available storage in the system. Data deduplication generally involves the identification of duplicate (triplicate, etc.) data portions, e.g. on different volumes or regions within the namespace, and reduction of the amount of storage consumed by freeing the storage space associated with all but one (or a relatively small number in cases where redundancy is desirable) copy of the data. To maintain consistency and provide access to the data, references such as pointers, etc. may be implemented to direct access requests to the single retained copy.

While deduplication effectively increases available storage compared to retaining a plurality of redundant duplicates, the technique implements additional metadata to manage the references pointing from the duplicated location to the retained data location.

However, when a system reaches its maximum physical space allowance, data must be released from the system user space in order to release physical space and thereby allow new data to be written thereto. In a non-deduplicated storage environment, it is relatively straight forward to release data from the system user space by having a minimal amount of reserved storage space in order to use when performing the data deletions, and subsequently perform a garbage collection process. However, this solution is inapplicable in systems which implement data deduplication, as performing a space deletion operation in a deduplicated storage environment provides no guarantee of actually freeing existing allocated physical space, even after garbage collection has subsequently been performed. Rather, space deletion processes implemented in conventional deduplicated storage environments consume even more space storing metadata corresponding to the deletion process, thereby exacerbating the storage shortage.

Accordingly, efficiently managing storage space in deduplicated storage environments is of great significance. It would therefore be beneficial to provide techniques, systems, and corresponding computer program products for efficiently managing space reclamation in a data deduplication storage system.

SUMMARY

A computer program product, according to one embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a request to delete a volume stored in one or more regions in physical space of a storage system. The physical space is divided into a first reserved area, a second reserved area, and a plurality of regions, where each region includes one or more physical blocks. The method additionally includes: determining, by the processor, whether at least one of the regions having at least a portion of the volume includes reclaimable space; deleting, by the processor, the portion of the volume from the at least one region having the reclaimable space in response to determining that at least one of the regions having at least a portion of the volume includes reclaimable space; and failing, by the processor, the received request to delete the volume in response to determining that none of the regions having at least a portion of the volume include reclaimable space.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform another method which includes: receiving, by the processor, a request to delete a volume stored in one or more regions in physical space of a storage system. The physical space is divided into a first reserved area, a second reserved area, and a plurality of regions, where each region includes one or more physical blocks. The method also includes: determining, by the processor, whether at least one of the regions having at least a portion of the volume includes reclaimable space; deleting, by the processor, the portion of the volume from the at least one region having the reclaimable space in response to determining that at least one of the regions having at least a portion of the volume includes reclaimable space; and storing metadata in the second reserved area in response to determining that none of the regions having at least a portion of the volume include reclaimable space, wherein the metadata denotes that the volume is deleted.

A computer-implemented method, according to yet another embodiment, includes: receiving a request to delete a volume stored in one or more regions in physical space of a storage system. The physical space is divided into a first reserved area, a second reserved area, and a plurality of regions, where each region includes one or more physical blocks. The computer-implemented method also includes: determining whether at least one of the regions having at least a portion of the volume includes reclaimable space. Reclaimable space in a given region is storage freed upon deleting the at least a portion of the volume from the given region. Furthermore, the computer-implemented method includes: deleting the portion of the volume from the at least one region having the reclaimable space in response to determining that at least one of the regions having at least a portion of the volume includes reclaimable space, determining whether an adequate amount of space is available in the second reserved area to store metadata which denotes that the volume is deleted in response to determining that none of the regions having at least a portion of the volume include reclaimable space, storing the metadata in the second reserved area in response to determining that an adequate amount of space is available in the second reserved area, and failing the received request in response to determining that an adequate amount of space is not available in the second reserved area.

Other aspects and embodiments of the present invention will become apparent from the following detailed description, which, when taken in conjunction with the drawings, illustrate by way of example the principles of the invention.

DETAILED DESCRIPTION

Figure 1:
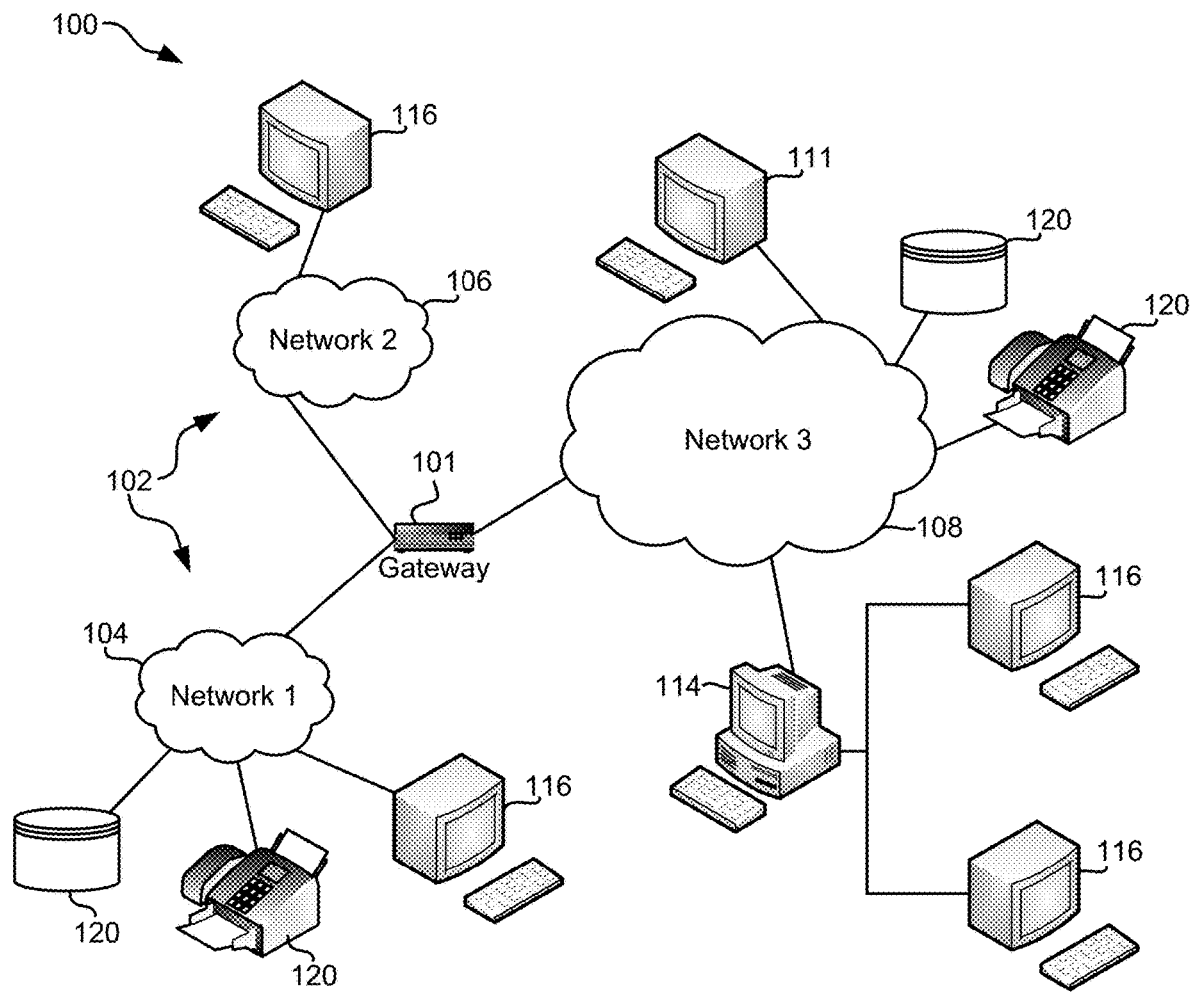
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for ensuring space reclamation in a data deduplication storage environment, even if a user is unaware of where certain data is stored. Some of the embodiments included herein thereby provide significant improvements to data management efficiency in deduplicated storage systems, e.g., as will be described in further detail below.

In one general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a request to delete a volume stored in one or more regions in physical space of a storage system. The physical space is divided into a first reserved area, a second reserved area, and a plurality of regions, where each region includes one or more physical blocks. The method additionally includes: determining, by the processor, whether at least one of the regions having at least a portion of the volume includes reclaimable space; deleting, by the processor, the portion of the volume from the at least one region having the reclaimable space in response to determining that at least one of the regions having at least a portion of the volume includes reclaimable space; and failing, by the processor, the received request to delete the volume in response to determining that none of the regions having at least a portion of the volume include reclaimable space.

In another general embodiment, a computer program product includes a computer readable storage medium having program instructions embodied therewith. The computer readable storage medium is not a transitory signal per se. Moreover, the program instructions are readable and/or executable by a processor to cause the processor to perform another method which includes: receiving, by the processor, a request to delete a volume stored in one or more regions in physical space of a storage system. The physical space is divided into a first reserved area, a second reserved area, and a plurality of regions, where each region includes one or more physical blocks. The method also includes: determining, by the processor, whether at least one of the regions having at least a portion of the volume includes reclaimable space; deleting, by the processor, the portion of the volume from the at least one region having the reclaimable space in response to determining that at least one of the regions having at least a portion of the volume includes reclaimable space; and storing metadata in the second reserved area in response to determining that none of the regions having at least a portion of the volume include reclaimable space, wherein the metadata denotes that the volume is deleted.

In yet another general embodiment, a computer-implemented method includes: receiving a request to delete a volume stored in one or more regions in physical space of a storage system. The physical space is divided into a first reserved area, a second reserved area, and a plurality of regions, where each region includes one or more physical blocks. The computer-implemented method also includes: determining whether at least one of the regions having at least a portion of the volume includes reclaimable space. Reclaimable space in a given region is storage freed upon deleting the at least a portion of the volume from the given region. Furthermore, the computer-implemented method includes: deleting the portion of the volume from the at least one region having the reclaimable space in response to determining that at least one of the regions having at least a portion of the volume includes reclaimable space, determining whether an adequate amount of space is available in the second reserved area to store metadata which denotes that the volume is deleted in response to determining that none of the regions having at least a portion of the volume include reclaimable space, storing the metadata in the second reserved area in response to determining that an adequate amount of space is available in the second reserved area, and failing the received request in response to determining that an adequate amount of space is not available in the second reserved area.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
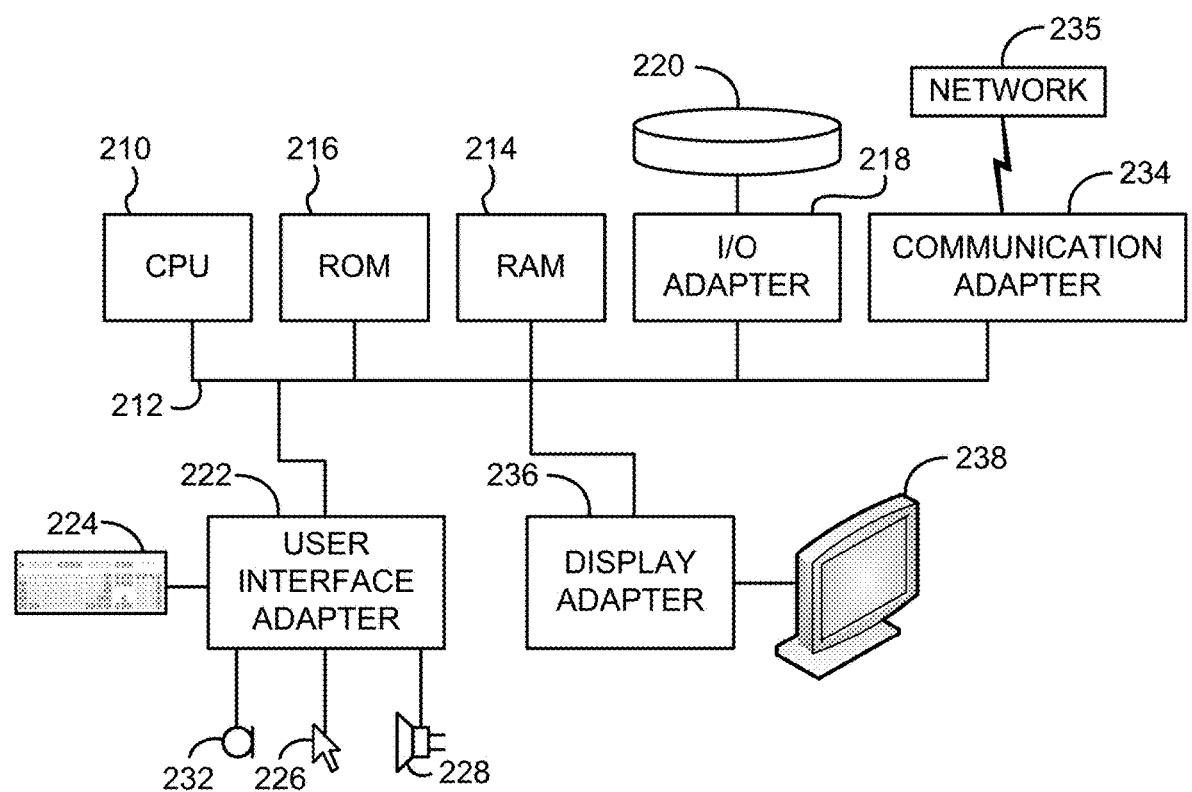
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
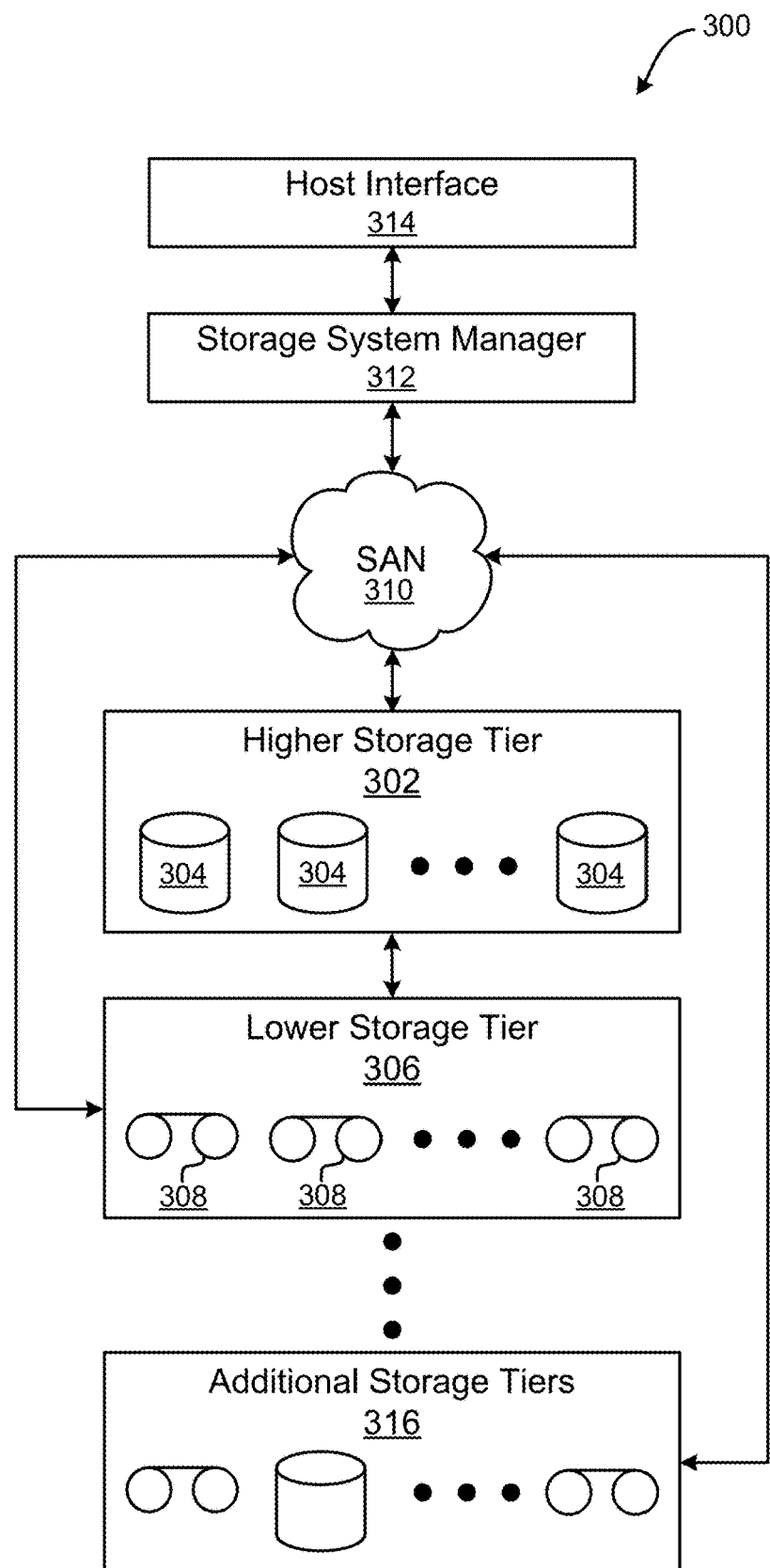
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As alluded to above, storage systems have been able to expand the concept of data reduction by introducing a technique known as deduplication of data. The concept of deduplication is to replace duplicate data across a storage system with pointers to a single instance of the data, and hence reduce the overall storage requirement.

A deduplication system is preferably able to identify duplicate data across potentially very large amounts of data. Once duplicates are found, the system is typically able to maintain data in a format containing data references over the entire system. A popular method for arranging the deduplicated data on the physical space of the storage, while maintaining performance, includes arranging the data in a format known as log structured array (LSA).

Figure 4:
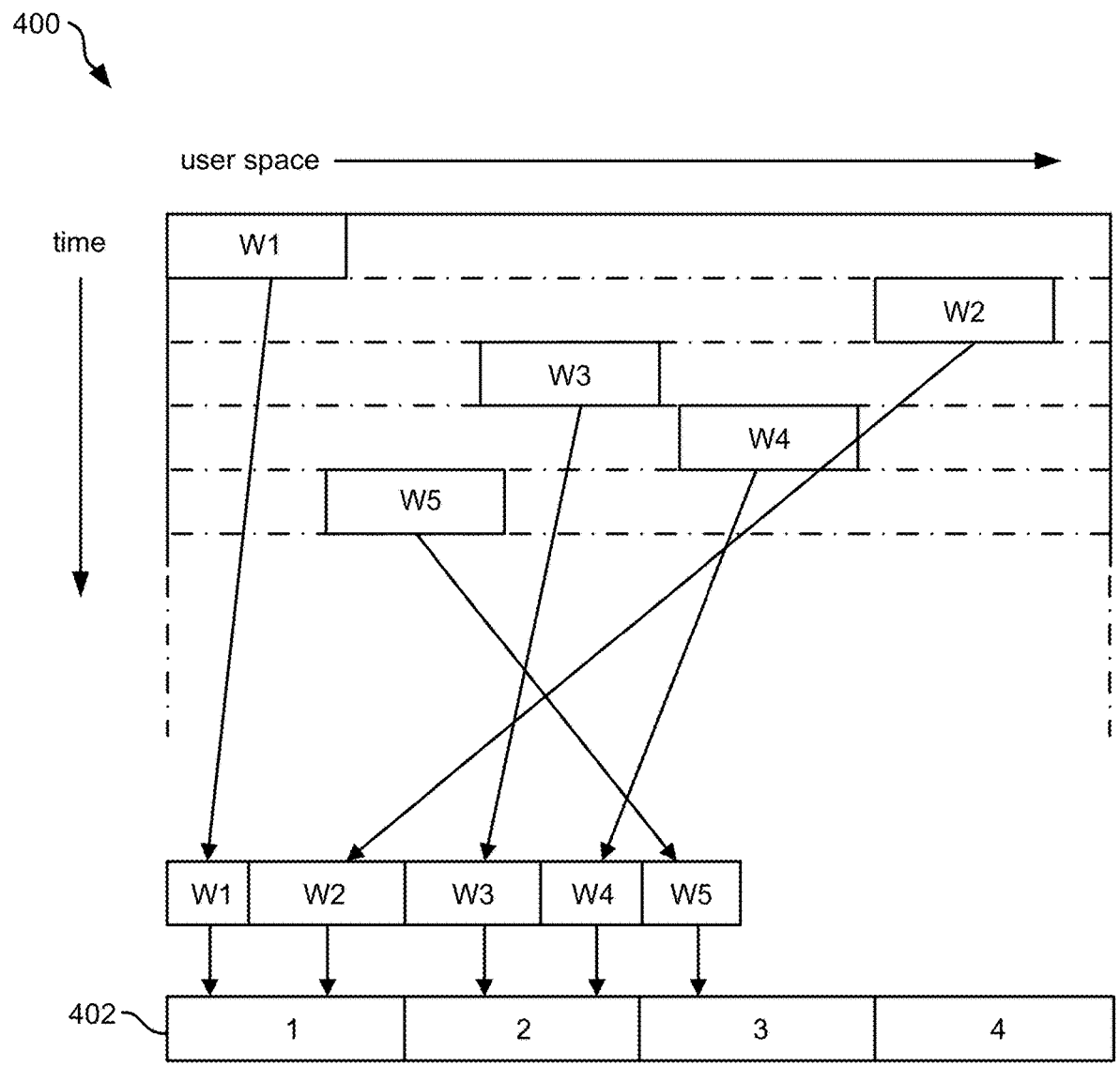
FIG. 4 is a representative diagram of a storage system in accordance with one embodiment.

Referring momentarily to FIG. 4, a representative diagram of a storage system 400 is illustrated in accordance with one embodiment, which is in no way intended to limit the invention. As shown, the storage system 400 implements a LSA storage format in which data is written to memory (e.g., disk, cache, etc.) in a journal-like fashion. Specifically, as data W1, W2, W3, W4, W5 is formed in user space over time, the data is ultimately mapped to physical spaces 1, 2, 3, 4 of physical memory 402 in chronological order as illustrated.

For LSA storage formats, any modification of data involves some writing being performed. Paradoxically, this includes performing a deletion, as deletions are recorded by generating metadata, thereby causing some writes to occur. Hence, data deletion temporarily consumes additional storage space.

Furthermore, logical deletion of data in deduplicated storage systems does not necessarily translate into physical erasure of the data originally written in physical space. For instance, pieces of data that have references pointing to them cannot be erased until the referring entities have given up the data as well, otherwise data corruption would result. Moreover, physical space (e.g., storage) is divided into blocks, each of which represents an allocation unit and is likely to contain several user writes from different, non-adjacent virtual offsets. Therefore, it may not be possible to free a block of physical space even if the block contains only a single deduplicated write that is referenced by other blocks.

When a system reaches its maximum physical space capacity, the system may prompt a user to release data from the system user space which in turn releases physical space and thereby allows new write operations to be performed. In a non-deduplicated environment, it is relatively straight forward to resolve this issue by designating a minimal amount of reserved area which is used to perform deletions and subsequent garbage collection processes. In such a solution, the overall amount of usable physical space is reduced to account for the reserve area. However, this solution is ineffective in systems that implement data deduplication because, as described above, performing user space deletion operations provide no guarantee of actually freeing existing allocated physical space even after garbage collection has subsequently been performed. Rather, space deletion processes implemented in conventional deduplicated storage environments consume even more space storing metadata corresponding to the deletion process, thereby exacerbating the storage shortage. As a result, conventional deduplicated storage systems are subject to being filled to capacity without any way of ensuring space reclamation, thereby undesirably preventing data read, write, or even deletion operations from being performed.

In sharp contrast, various embodiments described herein are able to efficiently manage space reclamation in data deduplication storage systems. In preferred approaches, reservation is utilized is such a way that ensures space reclamation caused by a deletion itself and the subsequent garbage collection processes, even in deduplicated storage environments, e.g., as will be described in further detail below.

Figure 5:
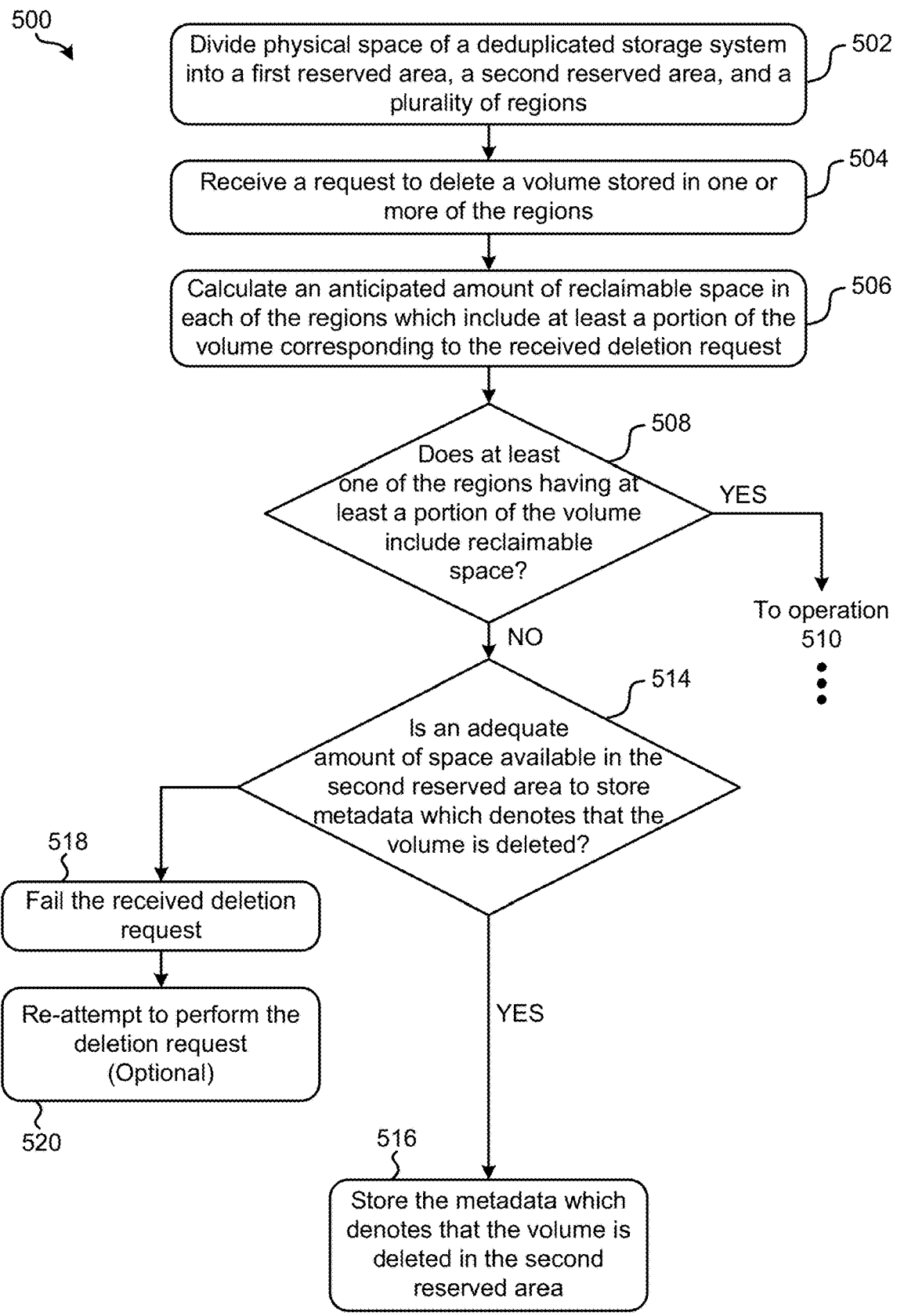
FIG. 5 is a flowchart of a method in accordance with one embodiment.
Figure 5:
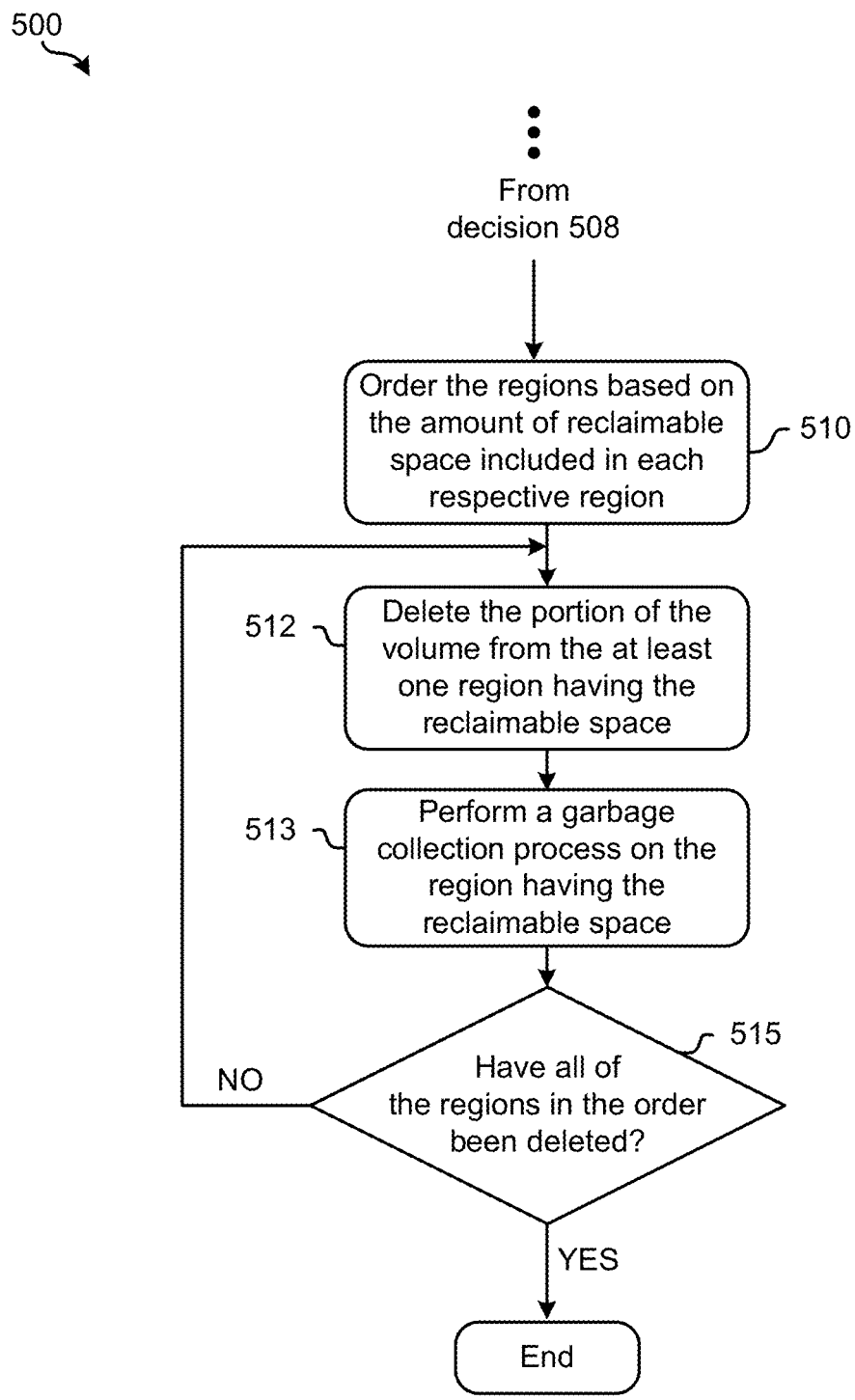

Now referring to FIG. 5, a flowchart of a computer-implemented method 500 for ensuring space reclamation in deduplicated storage systems, is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Figure 6:
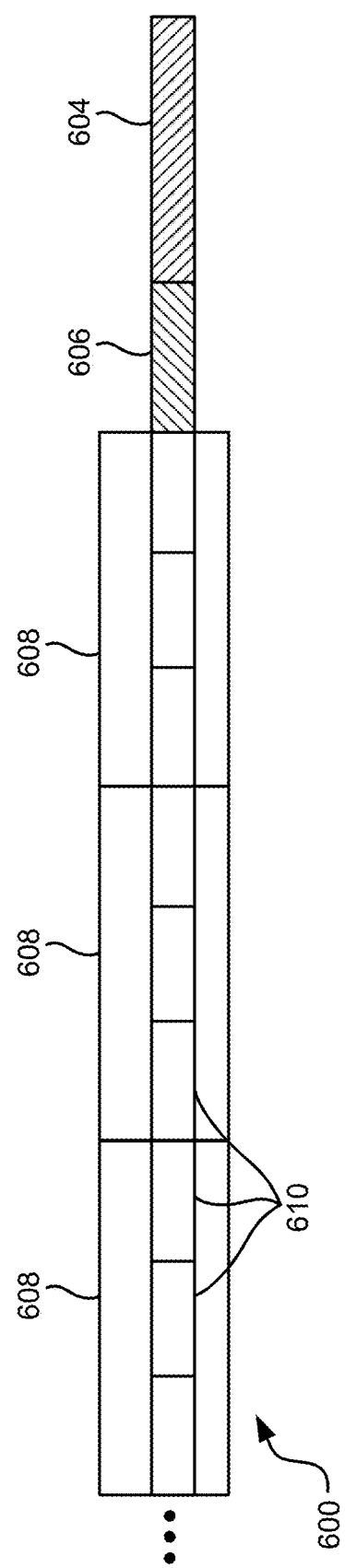
FIG. 6 is a partial representational view of physical space in accordance with one embodiment.

As shown in FIG. 5, operation 502 of method 500 includes dividing physical space of a deduplicated storage system into a first reserved area, a second reserved area, and a plurality of regions. Each of the regions are preferably the same size, and may each include one or more physical blocks, e.g., depending on the desired approach. Referring momentarily to FIG. 6, a partial representational view of physical space 600 which has been divided into a first reserved area 604, a second reserved area 606, and a plurality of regions 608 is illustrated according to an exemplary embodiment which is in no way intended to limit the invention. As shown, each of the regions 608 are approximately the same size and each include three respective blocks 610. It should be noted that although only three regions 608 have been illustrated in the present embodiment, the physical space 600 may include any desired number of regions (represented by the three dots), the number of which may depend on the amount of physical space, the size of the regions, etc. According to an illustrative approach which is in no way intended to limit the invention, the physical blocks may each be about 1 kB in size, but may be larger or smaller, e.g., depending on the amount of memory available to perform the deletion process. The blocks 610 in the regions 608 may be used to store data and/or metadata corresponding to user write commands, which may be later accessed (e.g., via read commands), deleted, updated, etc., as would be appreciated by one skilled in the art after reading the present description.

The number of blocks included in each of the regions may also have an effect on the accuracy by which a given volume may be deleted from the storage system. For instance, a relatively small region which includes at least one single block may provide the greatest amount of accuracy for performing a volume deletion as well as the best performance. However, smaller regions having at least one single block are also the most memory intensive in view of the fact that all physical blocks in the system are mapped to their respective contents. On the other hand, implementing relatively large regions having a plurality of blocks reduces the accuracy by which a volume deletion may be performed, but also reduces the amount of memory used to store data therein. It follows that the size of the regions (e.g., the number of blocks included in each of the regions) may vary depending on the desired embodiment. Specifically, the tradeoff between memory use and volume deletion accuracy may be weighed to determine a desirable balance for a given storage system. In some approaches the physical storage may even be re-divided to adjust the size of the regions after some time has passed, after one or more failures occur, upon user request, when the storage system is reconditioned, etc.

The regions may be specifically defined in some approaches as a part of the process of dividing the physical space. However, in other approaches, preexisting regions which serve other purposes may be utilized and used to store data and/or metadata of volumes as described herein. According to an example which is in no way intended to limit the invention, physical space with built in regions and/or an existing region manager metadata structure may be utilized when performing operation 502, e.g., as would be appreciated by one skilled in the art after reading the present description.

Referring still to FIG. 6, the first reserved area 604 is preferably configured to store data and/or metadata associated with performing a garbage collection operation on at least one entire region 608. It follows that the first reserved area 604 is preferably at least large enough to store a sufficient amount of metadata to perform a garbage collection operation on at least one entire region 608. Moreover, a size of the first reserved area 604 may be fixed.

The second reserved area 606 is preferably configured to store metadata which denotes (e.g., marks or designates) that at least one volume is deleted. Again, it follows that the second reserved area 606 is preferably large enough to store (e.g., contain) enough metadata to denote that at least one entire volume has been deleted. Thus, the actual size of the second reserved area 606 may be a function of the volume size in a given embodiment and/or how many volumes the second reserved area 606 is able to simultaneously denote as being deleted, e.g., which will be described in further detail below. It should also be noted that although the first and second reserved areas 604, 606 are illustrated in the present embodiment as having a particular location along the physical space, neither of the reserved areas are required to be a physically continuous space. Rather, the first and/or second reserved areas 604, 606 may simply be an amount of free space for which the actual physical location may change over time. In other words, the first and/or second reserved areas 604, 606 may vary in size and/or actual location along the physical space, e.g., depending on the desired approach.

Referring again to FIG. 5, it should be noted that in some approaches, operation 502 may be performed separately from the remainder of the operations included in method 500. For instance, the physical space of the storage system may be divided and defined according to operation 502 during a preliminary storage management step of forming the storage system.

Furthermore, operation 504 includes receiving a request to delete a volume stored in one or more of the regions. A deletion request may be received in a number of different situations. For instance, in some approaches a deletion request may be received from a user who simply wishes to delete a volume as a result of normal system operation. In other approaches a deletion request may be received in response to a warning sent to a user indicating that the storage system is at, or near (e.g., greater than 80%, 85%, 90%, 95%, 99%, etc.) capacity. When a storage system is at or near capacity, the storage system may enter an "out-of-partition state" in which certain user requests may be delayed and/or rejected. In other words, the storage system may enter a restricted mode. For instance, user write requests may not be performed when the storage system is at capacity and in a restricted mode, as the storage system does not include any storage space to write the data to. In still other approaches, a deletion request may be automatically generated in response to a predetermined condition being met and subsequently received by a processor performing one or more of the operations included in method 500.

It should be noted that a volume is typically much larger than a single region in the physical space. Thus, a request received to delete a given volume may involve data stored on more than one region. Moreover, as described above, although a request to delete a given volume is received, the volume (or portions thereof) may have references pointing to it and may not be erased until the referring entities have given up the data as well. It follows that space (or data) included in a given volume may either be reclaimable, or non-reclaimable. With reference to the present description, "reclaimable data" is intended to refer to data that is exclusively owned by a given volume and which is not referenced by any other volume, while "reclaimable space" is intended to refer to the storage space which would be freed as a result of deleting the reclaimable data. Accordingly, reclaimable data may be deleted from physical memory without causing any data corruption or pointer errors. In other words, the amount of reclaimable space in a given region is the amount of storage space which would ultimately be freed in response to deleting a volume from the given region. However, "non-reclaimable data" is intended to refer to data which is referenced by other volumes and therefore cannot be successfully freed even if the volume is deleted and a subsequent garbage collection process is performed. Similarly, "non-reclaimable space" is intended to refer to the storage space which would not be freed despite attempting to delete it from a given region.

Accordingly, operation 506 includes calculating an anticipated amount of reclaimable space in each of the regions which include at least a portion of the volume corresponding to the received deletion request. Again, a volume typically spans across more than one region. Thus, portions of a volume in a first region may include reclaimable data, while portions of the same volume in a second region may include non-reclaimable data.

An anticipated amount of reclaimable space may be calculated for a given region by implementing various different processes depending on the amount of available resources, desired accuracy, user preference, etc. According to some approaches, an anticipated amount of reclaimable space may be calculated for a given region by determining (e.g., counting) the amount of unique data included in each of the regions, where "unique data" is data that is not referenced, e.g., by pointers. In other approaches, advanced mechanisms which are able to factor in deduplicated data in a given region or volume may be implemented to calculate an anticipated amount of reclaimable space for a given region. In other words, an advanced mechanism which is able to determine deduplication relationships in a given storage system may be implemented in some approaches. Such advanced mechanisms may include any type of mechanism which would be apparent to one skilled in the art after reading the present description.

Method 500 further includes determining whether at least one of the regions having at least a portion of the volume includes reclaimable space. See decision 508. Again, reclaimable space in a given region is storage space which would be freed upon deleting the at least a portion of the volume from the given region. Thus, decision 508 is essentially ensuring that after a deletion is performed on a given region, the amount of available space in the system is at least somewhat reduced. Moreover, it is preferred that the amount of available storage space in the second reserved area after a given region is deleted, is at least equal to the amount of storage space available in the second reserved area before the deletion occurred. This is because, if the deletion of a region results in more information being stored in the second reserved area than before the deletion was performed, the act of deleting the region provides no benefit to the system and the resources consumed to perform the deletion are wasted. Moreover, if the amount of information stored in the second reserved area is able to increase after the deletion has been performed, then the reserve space will eventually be filled and the system will eventually be forced to halt. Again, logical deletion of data in deduplicated storage systems does not necessarily translate into physical erasure of the data originally written in physical space. Thus, performing a deletion operation on any data stored in a region determined to not have any reclaimable space will not result in any storage actually being freed at the physical level.

It should be noted that although the present embodiment performs decision 508 after calculating the anticipated amount of reclaimable space in each of the regions which include at least a portion of the volume as seen in operation 506, in other embodiments a determination as to whether any of the regions include at least some reclaimable space may be made first. Moreover, once one or more of the regions are determined to include reclaimable space, an actual anticipated amount of reclaimable space may be calculated for each of the regions determined to have at least some reclaimable space therein.

With continued reference to FIG. 5, the flowchart of method 500 proceeds to operation 510 in response to determining that at least one of the regions having at least a portion of the volume includes reclaimable space. There, operation 510 includes ordering (e.g., organizing) the regions based on the amount of reclaimable space included in each respective region. According to some approaches, an identifier (e.g., physical address) corresponding to each of the respective regions may be ordered and placed in a queue. In other approaches, an identifier corresponding to each of the respective regions may be organized in a lookup table such that an order relative to the amount of reclaimable space in each of the regions is preserved.

Ordering the regions based on the amount of reclaimable space included in each respective region is desirable, as deleting the regions in an unorderly fashion may result in the garbage collection process venturing outside the reserved area boundaries. This may consequently prevent the availability to perform garbage collection on any subsequent regions. Accordingly, it is again preferred to ensure that the storage system has at least the same number of blocks available in the reserved area as before a deletion operation and garbage collection process were performed. Moreover, a subsequent region may be processed in response to determining that at least the same number of blocks are available, e.g., as mentioned above.

Operation 512 includes deleting the portion of the volume from the at least one region having the reclaimable space. Moreover, operation 513 includes performing a garbage collection process (e.g., operation) on the region having the reclaimable space. Finally, decision 515 includes determining whether all of the regions included in the order formed in operation 510 been deleted. In other words, decision 515 determines whether all the regions in the order have had the at least a portion of the volume deleted therefrom. Method 500 returns to operation 512 in response to determining that not all of the regions have been deleted, whereby the at least a portion of the volume is deleted from a subsequent one of the regions in the order. However, method 500 may end in response to determining that all of the regions in the order have been deleted. It should be noted that although method 500 may "end", any one or more of the operations and/or decisions included therein may be re-performed, e.g., in response to receiving another request to delete a different volume stored in one or more of the regions (e.g., see operation 504 above).

Although deleting the volume from any of the regions determined to have reclaimable space, and subsequently performing a garbage collection operation, will contribute towards increasing the amount of available (e.g., free) storage in the storage system, it is preferred that the deletion processes begins with a region having a greatest amount of reclaimable space and progresses (works) towards a region having a least amount of reclaimable space. By doing so, the storage system is continually afforded the greatest amount of reclaimed space that is available in any of the regions, eventually reaching the region having the least amount of reclaimable space. This approach may be particularly desirable when attempting to increase the percentage of available space in the storage system, e.g., such that the storage system may return to a normal mode of operation. As mentioned above, when a storage system reaches capacity, or is sufficiently near capacity (e.g., the storage system does not have a sufficient amount of storage space available to successfully perform a deletion request), the storage system may enter a restricted mode in which certain user requests may be delayed and/or rejected. For instance, user write requests may not be performed when the storage system is at capacity and in a restricted mode, as the storage system does not include any storage space to write the data to.

It follows that the regions are preferably ordered in operation 510 such that the region determined to have the greatest amount of reclaimable space is available for deletion first, and the region determined to have the least amount of reclaimable space is available for deletion last. However, it should be noted that any other arrangement of the regions, or order in which the regions are deleted, may be implemented depending on the desired embodiment. For instance, the regions may be organized and/or deleted in an order which depends on the importance of the portion of the volume included therein, a placement of the given region in the physical space, user preference, predetermined criteria, etc.

Returning to decision 508, method 500 proceeds to decision 514 in response to determining that none of the regions having at least a portion of the volume include reclaimable space. There, decision 514 includes determining whether an adequate amount of space is available in the second reserved area to store metadata which denotes (e.g., indicates) that the volume is deleted. As previously mentioned, if none of the regions which have at least a portion of the volume stored therein include reclaimable space, then the volume itself cannot actually be deleted from physical memory. However, in some instances it may be desirable to ensure that a particular volume is eventually deleted regardless of whether any regions which contain a portion of the volume have any reclaimable space. Thus, the second reserved area may be used in some instances to store metadata which denotes that at least one volume has effectively been deleted, despite the fact that the volume has not yet been deleted from physical memory.

As shown, method 500 proceeds to operation 516 in response to determining that an adequate amount of space is available in the second reserved area. There, operation 516 includes storing the metadata which denotes that the volume is deleted in the second reserved area. As a result, the volume may be marked as deleted until a future point in time, e.g., when the entities referring the volume have given up the pointers as well. Moreover, metadata denoting that a given volume is deleted may remain in the second reserved area until the physical space which previously stored data of the volume is reused, e.g., as a result of a garbage collection process. Again, it follows that the second reserved area is preferably large enough to store (e.g., contain) enough metadata to denote that at least one entire volume has been deleted. Thus, the actual size of the second reserved area may be a function of the volume size in a given embodiment, how many volumes the second reserved area is able to simultaneously denote as being deleted, how many regions the second reserved area corresponds to, etc. According to one approach, the second reserved area may include a metadata deletion log.

Returning to decision 514, method 500 proceeds to operation 518 in response to determining that an adequate amount of space is not available in the second reserved area. As shown, operation 518 includes failing the received deletion request. Noting the flow of method 500, it is apparent that failing a deletion request may be performed in response to determining that the volume is composed of only non-reclaimable data and the second reserved area does not include enough available space to store the metadata associated with denoting the volume has been deleted. In such a scenario, it is preferable that a different volume which has a sufficient amount of reclaimable space is deleted first. Thus, in some approaches, failing the volume deletion request may include requesting indication of an alternative volume to delete. This may be performed by sending a request to the user as a cue which prompts the user to select a different volume to delete.

In some approaches, it may be desirable to attempt deleting the volume associated with the failed deletion request at a later point in time. Accordingly, method 500 may further implement optional operation 520 which includes re-attempting to perform the deletion request, e.g., at a later point in time. According to some approaches, the subsequent attempt to delete the deletion request may be performed without any user intervention, e.g., after a predetermined amount of time has passed, in response to a condition being met, etc. However, in other approaches, the act of re-attempting to perform the deletion request may be initiated upon receiving a request. For instance, the process of failing the deletion request in operation 518 may include sending a notification to a user that the deletion request has been failed. In one approach, the notification may also instruct and/or suggest that the user send another request to delete the same volume at a later point in time. Accordingly, optional operation 520 may be performed in response to receiving a second request to delete the same volume.

It should be noted that any one or more of the operations and/or decisions included in method 500 may be applied to more than one volume at a time. For instance, the deletion request received in operation 504 may correspond to a set of volumes rather than a single volume. In such a situation, the set of volumes may be ordered based on the amount of reclaimable space included in each of the respective volumes. According to a preferred approach, the volume having the greatest number of regions with the greatest amount of freeable space therein may be placed first in the order, while the volume having the least number of regions with the least amount of freeable space may be placed last in the order. As a result, the volume which affords the greatest amount of relief to the storage system is processed first, and the volume which affords the least amount of reclaimable space to the system is eventually processed last after all the other volumes in the order have been processed. According to the present description, a volume may be processed by implementing any one or more of the processes included in method 500. Moreover, if any of the volumes in the set of volumes do not translate to any reclaimable space in the storage system, the second reserved area may be used to store metadata which denotes that volume is deleted, e.g., if there is a sufficient amount of free space therein.

It follows that various embodiments described herein are able to ensure space reclamation in a data deduplication storage environment, even if a user is unaware of where certain data is stored. These embodiments thereby provide significant improvements to data management efficiency in deduplicated storage systems, particularly in view of the shortcomings experienced by conventional products. Ultimately, these improvements lead to sustained system throughput over time, overall system resiliency, increasing the efficiency by which data is processed in the storage system, etc.

Furthermore, although it may be desirable to implement various ones of the approaches described herein when a storage system reaches capacity, or is sufficiently near capacity, any one or more of the approaches described herein may also be implemented during normal operation of the storage system, e.g., to improve space allocation efficiency during normal use.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium having program instructions embodied therewith, wherein the computer readable storage medium is not a transitory signal per se, the program instructions readable and/or executable by a processor to cause the processor to perform a method comprising:
   receiving, by the processor, a request to delete a volume stored in one or more regions in physical space of a storage system, wherein the physical space is divided into a first reserved area, a second reserved area, and a plurality of regions, wherein each region includes one or more physical blocks;
   determining, by the processor, whether at least one of the regions having at least a portion of the volume includes reclaimable space;
   deleting, by the processor, the portion of the volume from the at least one region having the reclaimable space in response to determining that at least one of the regions having at least a portion of the volume includes reclaimable space; and
   failing, by the processor, the received request to delete the volume in response to determining that none of the regions having at least a portion of the volume include reclaimable space.

2. The computer program product of claim 1, wherein the storage system is a deduplicated storage system.

3. The computer program product of claim 1, wherein determining whether at least one of the regions having at least a portion of the volume includes reclaimable space includes:
   calculating, by the processor, an amount of reclaimable space in each of the regions,
   wherein the amount of reclaimable space in a given region is an amount of storage freed upon deleting the at least a portion of the volume from the given region.

4. The computer program product of claim 3, wherein deleting at least a portion of the volume from each of the regions which include reclaimable space begins with a region having a greatest amount of reclaimable space and progresses towards a region having a least amount of reclaimable space.

5. The computer program product of claim 1, wherein the second reserved area is configured to store metadata which denotes that at least one volume is deleted.

6. The computer program product of claim 1, wherein the first reserved area is configured to store data and/or metadata associated with performing a garbage collection operation on at least one region.

7. The computer program product of claim 6, wherein a size of the first reserved area is fixed.

8. The computer program product of claim 1, wherein failing the received request includes:
   requesting, by the processor, indication of an alternative volume to delete.

9. A computer program product comprising a computer readable storage medium having program instructions embodied therewith, wherein the computer readable storage medium is not a transitory signal per se, the program instructions readable and/or executable by a processor to cause the processor to perform a method comprising:
   receiving, by the processor, a request to delete a volume stored in one or more regions in physical space of a storage system, wherein the physical space is divided into a first reserved area, a second reserved area, and a plurality of regions, wherein each region includes one or more physical blocks;
   determining, by the processor, whether at least one of the regions having at least a portion of the volume includes reclaimable space;
   deleting, by the processor, the portion of the volume from the at least one region having the reclaimable space in response to determining that at least one of the regions having at least a portion of the volume includes reclaimable space; and
   storing metadata in the second reserved area in response to determining that none of the regions having at least a portion of the volume include reclaimable space, wherein the metadata denotes that the volume is deleted.

10. The computer program product of claim 9, wherein the storage system is a deduplicated storage system.

11. The computer program product of claim 9, wherein determining whether at least one of the regions having at least a portion of the volume includes reclaimable space includes:
   calculating, by the processor, an amount of reclaimable space in each of the regions, wherein the amount of reclaimable space in a given region is an amount of storage freed upon deleting the at least a portion of the volume from the given region.

12. The computer program product of claim 11, wherein deleting at least a portion of the volume from each of the regions which include reclaimable space begins with a region having a greatest amount of reclaimable space and progresses towards a region having a least amount of reclaimable space.

13. The computer program product of claim 9, wherein the second reserved area is configured to store metadata which denotes that more than one volume is deleted, wherein a size of the second reserved area is a function of how many volumes the second reserved area is able to simultaneously denote as being deleted.

14. The computer program product of claim 9, wherein the first reserved area is configured to store data and/or metadata associated with performing a garbage collection operation on at least one region.

15. The computer program product of claim 14, wherein a size of the first reserved area is fixed.

16. A computer-implemented method, comprising:
receiving a request to delete a volume stored in one or more regions in physical space of a storage system, wherein the physical space is divided into a first reserved area, a second reserved area, and a plurality of regions, wherein each region includes one or more physical blocks;
determining whether at least one of the regions having at least a portion of the volume includes reclaimable space, wherein reclaimable space in a given region is storage freed upon deleting the at least a portion of the volume from the given region;
deleting the portion of the volume from the at least one region having the reclaimable space in response to determining that at least one of the regions having at least a portion of the volume includes reclaimable space;
determining whether an adequate amount of space is available in the second reserved area to store metadata which denotes that the volume is deleted in response to determining that none of the regions having at least a portion of the volume include reclaimable space;
storing the metadata in the second reserved area in response to determining that an adequate amount of space is available in the second reserved area; and
failing the received request in response to determining that an adequate amount of space is not available in the second reserved area.

17. The computer-implemented method of claim 16, wherein the storage system is a deduplicated storage system.

18. The computer-implemented method of claim 16, wherein deleting at least a portion of the volume from each of the regions which include reclaimable space begins with a region having a greatest amount of reclaimable space and progresses towards a region having a least amount of reclaimable space.

19. The computer-implemented method of claim 16, wherein the first reserved area is configured to store data and/or metadata associated with performing a garbage collection operation on at least one region, wherein a size of the first reserved area is fixed, wherein the second reserved area is configured to store metadata which denotes that at least one volume is deleted.

20. The computer-implemented method of claim 16, wherein failing the received request includes:
requesting indication of an alternative volume to delete.

* * * * *